US008328690B2

(12) United States Patent
Ohtsu

(10) Patent No.: US 8,328,690 B2
(45) Date of Patent: Dec. 11, 2012

(54) BRAKING/DRIVING FORCE CONTROL APPARATUS FOR VEHICLE

(75) Inventor: Nobuyuki Ohtsu, Isehara (JP)

(73) Assignee: Hitachi, Ltd., Tokyo (JP)

( * ) Notice: Subject to any disclaimer, the term of this patent is extended or adjusted under 35 U.S.C. 154(b) by 726 days.

(21) Appl. No.: 12/491,625

(22) Filed: Jun. 25, 2009

(65) Prior Publication Data

US 2010/0009808 A1    Jan. 14, 2010

(30) Foreign Application Priority Data

Jul. 10, 2008    (JP) .................................. 2008-180006

(51) Int. Cl.
*B60W 10/18* (2012.01)
(52) U.S. Cl. ...................................... 477/185
(58) Field of Classification Search .................. 477/182, 477/183, 184, 185, 186, 187, 203; 701/82, 701/70, 71, 73, 74, 75, 79, 80, 81, 84, 89; 303/139, 15, 20, 141, 148–150, 155, 160, 303/165, 171, 183, 185
See application file for complete search history.

(56) References Cited

U.S. PATENT DOCUMENTS

| 5,193,888 | A | * | 3/1993 | Okazaki et al. | ............... | 303/163 |
| 5,265,694 | A | * | 11/1993 | Yamashita | ..................... | 180/197 |
| 5,320,422 | A | * | 6/1994 | Tsuyama et al. | ............... | 303/141 |
| 5,390,991 | A | * | 2/1995 | Tozu et al. | ..................... | 303/165 |
| 6,192,857 | B1 | | 2/2001 | Shimada | | |
| 6,208,929 | B1 | * | 3/2001 | Matsuno et al. | ................ | 701/89 |
| 7,561,954 | B2 | * | 7/2009 | Aizawa et al. | ................... | 701/79 |

FOREIGN PATENT DOCUMENTS

| JP | 1-249555 A | 10/1989 |
| JP | 2000-008931 A | 1/2000 |

* cited by examiner

*Primary Examiner* — Justin Holmes
*Assistant Examiner* — David J Hlavka
(74) *Attorney, Agent, or Firm* — Foley & Lardner LLP

(57) ABSTRACT

A braking/driving force control apparatus for a vehicle includes a drive wheel configured to be driven by an output of a drive source; a brake unit configured to control a braking force to be applied to the drive wheel, in accordance with a state of the vehicle; and a brake control unit configured to control the brake unit, and configured to reduce a brake torque of the drive source when the brake unit actually applies a braking force to at least the drive wheel of the vehicle.

20 Claims, 12 Drawing Sheets

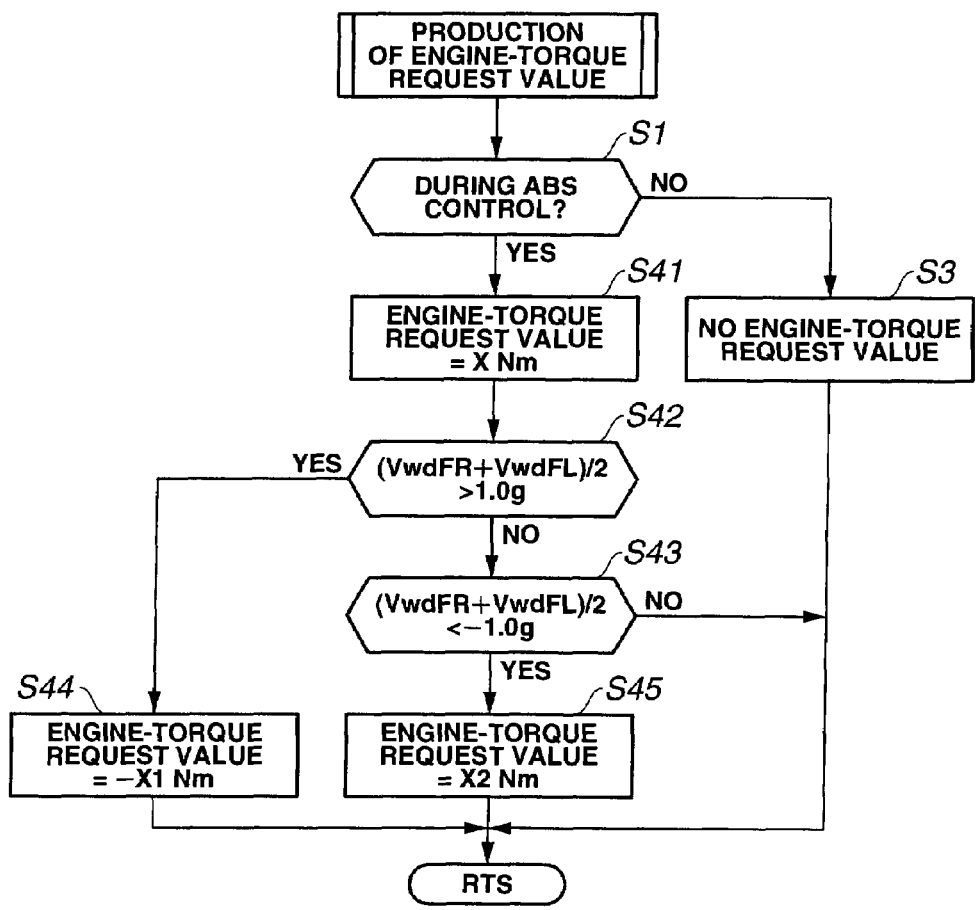
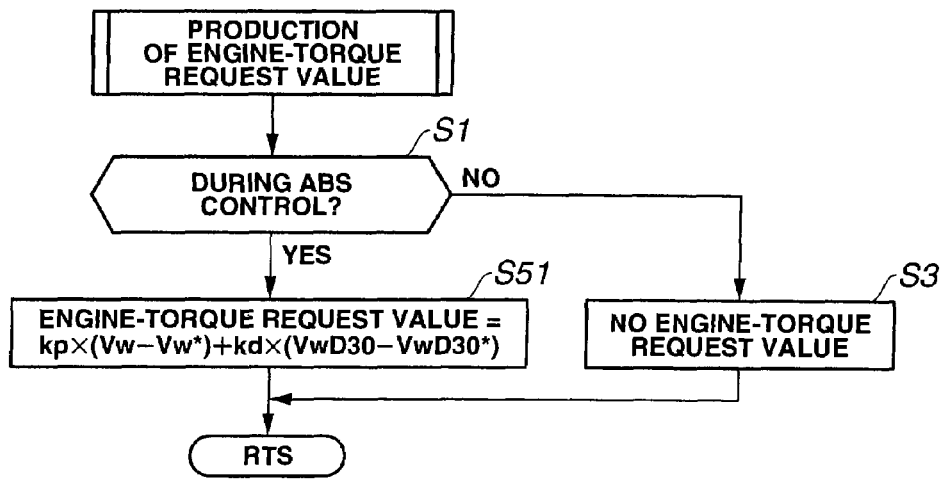

BRAKING/DRIVING FORCE CONTROL APPARATUS FOR VEHICLE

BACKGROUND OF THE INVENTION

The present invention relates to a braking/driving force control apparatus for a vehicle, adapted to control a torque of engine brake when braking the vehicle.

Japanese Patent Application Publication No. H01-249555 discloses a previously-proposed technique. In this technique, in the case that a lower-side deviation of a road-wheel speed occurs due to an influence of engine brake under operation of an antiskid brake system (ABS), an idle up of an engine is carried out in order to promptly recover the speed of the road-wheel whose fluid pressure has been reduced.

SUMMARY OF THE INVENTION

However, in the above-described technique, because only an idle speed is simply controlled, namely because a torque of engine brake is not proactively controlled, the influence of engine-brake torque against a brake control (such as ABS) is not effectively suppressed.

It is therefore an object of the present invention to provide a braking/driving force control apparatus for a vehicle, devised to effectively suppress an influence of brake torque of a drive source against a brake control.

According to one aspect of the present invention, there is provided a braking/driving force control apparatus for a vehicle, comprising: a drive wheel configured to be driven by an output of a drive source; a brake unit configured to control a braking force to be applied to the drive wheel, in accordance with a state of the vehicle; and a brake control unit configured to control the brake unit, and configured to reduce a brake torque of the drive source when the brake unit actually applies a braking force to at least the drive wheel of the vehicle.

According to another aspect of the present invention, there is provided a braking/driving force control apparatus for a vehicle, comprising: a brake unit configured to control a braking force to be applied to wheels of the vehicle, in accordance with a state of the vehicle; a brake control unit configured to control the brake unit; and an engine control unit configured to control a state of an engine so as to reduce an engine-brake torque or so as to increase a rotational speed of the engine in accordance with an output signal of the brake control unit, when the brake unit actuates at least a drive wheel among the wheels.

According to still another aspect of the present invention, there is provided a braking/driving force control apparatus for a vehicle, comprising: an antiskid brake control unit configured to perform an antiskid brake control for increasing or decreasing wheel-cylinder fluid pressures of wheels of the vehicle in accordance with a slip state of the wheels; and an engine control unit configured to control an output of an engine, so as to adjust an engine-brake torque in accordance with the slip state of the wheels or in accordance with an accelerating/decelerating state of the wheels, when the antiskid brake control is acting on at least a drive wheel of the wheels.

The other objects and features of this invention will become understood from the following description with reference to the accompanying drawings.

BRIEF DESCRIPTION OF DRAWINGS

FIG. 10 is a flowchart showing a producing process of the engine-torque request value, that is executed in the brake control unit 32 in a fourth embodiment according to the present invention.

FIG. 11 is a flowchart showing a producing process of the engine-torque request value, that is executed in the brake control unit 32 in a fifth embodiment according to the present invention.

DETAILED DESCRIPTION OF THE INVENTION

Figure 1:
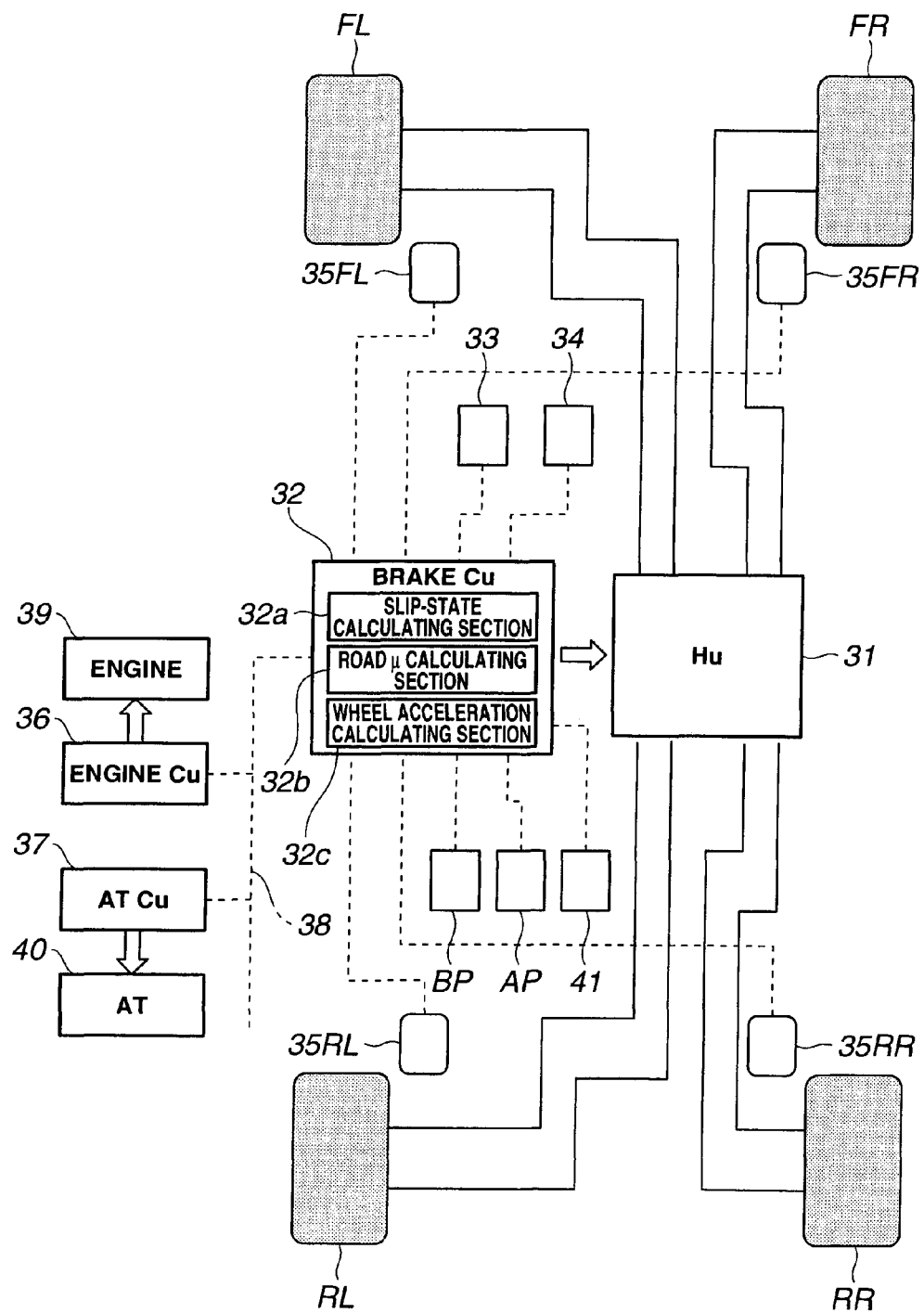
FIG. 1 is a schematic system configuration view of a braking/driving force control apparatus for a vehicle, in a first embodiment according to the present invention.

Reference will hereinafter be made to the drawings in order to facilitate a better understanding of the present invention. Embodiments according to the present invention will be explained referring to the drawings.

First Embodiment

Figure 2:
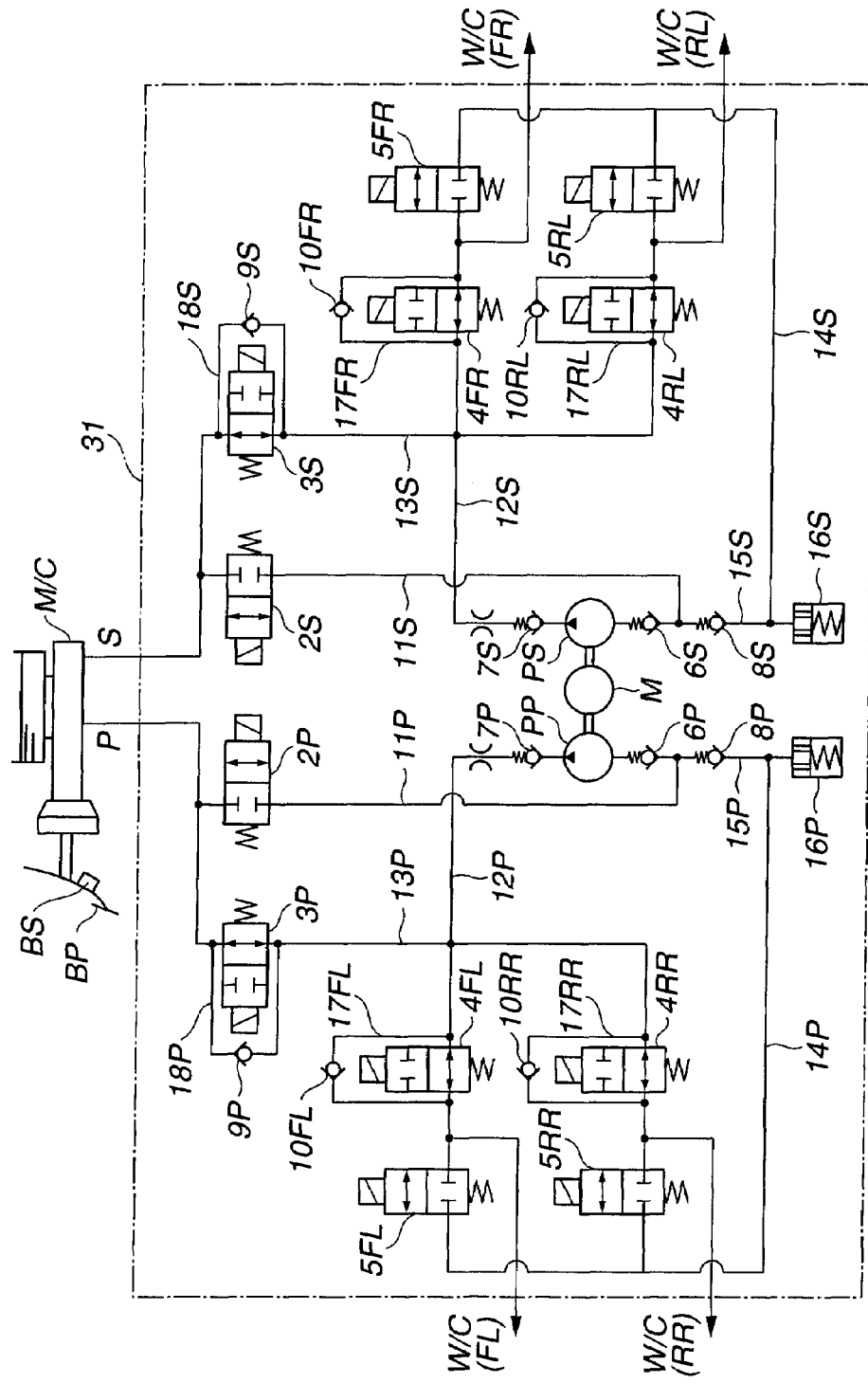
FIG. 2 is a hydraulic circuit diagram of a hydraulic unit 31 in the first embodiment.

At first, a configuration according to a first embodiment of the present invention will now be explained. FIG. 1 is a schematic system configuration view of a braking/driving force control apparatus for a vehicle, in the first embodiment. FIG. 2 is a (oil) hydraulic circuit diagram of a hydraulic unit (brake unit, hereinafter also referred to as HU) 31 in the first embodiment. In the first embodiment, the vehicle includes an engine 39 as a drive source, and is a vehicle of FF type (front-wheel-drive vehicle) in which left and right front wheels FL and FR are driven by the engine 39. The hydraulic unit 31 is provided to construct a so-called diagonal split layout of brake circuit having two pipe lines of a P-line and an S-line, that is sometimes termed "X-split layout".

The hydraulic unit 31 serves to maintain, increase or reduce respective fluid pressures of a wheel cylinder W/C (FL) of a left-front wheel FL, a wheel cylinder W/C (RR) of a right-rear wheel RR, a wheel cylinder W/C (FR) of a right-front wheel FR and a wheel cylinder W/C (RL) of a left-rear wheel RL, on the basis of commands derived from a brake control unit (hereinafter also referred to as brake CU) 32.

The brake control unit 32 judges an implementation of a braking control, on the basis of an information obtained from a combined sensor 33, a steering angle sensor 34 and respective road-wheel speed sensors 35FL, 35FR, 35RL and 35RR, and an information obtained through a CAN communication line 38 from an engine control unit (hereinafter also referred to as engine CU) 36 and an automatic-transmission control unit (hereinafter also referred to as ATCU) 37. During a braking control, the brake control unit 32 produces the commands for maintaining, increasing and reducing the fluid pressure (hydraulic pressure) of each wheel cylinder.

A brake pedal BP is manipulated when a driver conducts a braking of the vehicle, so that the brake pedal BP generates a braking force signal corresponding to the manipulated variable (operation amount) of the driver. A brake switch BS is made to become in ON status when the driver has depressed the brake pedal BP beyond a predetermined level (constant amount). The brake control unit 32 determines that the brake manipulation of the driver is present when the brake switch BS is in ON status, and on the other hand, determines that the brake manipulation of the driver is absent when the brake switch BS is in OFF status.

Each wheel cylinder W/C brakes the corresponding road-wheel. The combined sensor 33 is formed by packaging an acceleration sensor and a yaw rate sensor together, namely is a packed member of the acceleration sensor and yaw rate sensor. This acceleration sensor functions to sense an acceleration in a front-rear direction of the vehicle, and the yaw rate sensor functions to sense a yaw rate acting on the vehicle. Moreover, the acceleration sensor can function to sense an acceleration in the front-rear direction according to a road surface gradient (road inclination). Hence, by use of this function, also the road surface gradient is detected in the first embodiment.

The steering angle sensor 34 functions to sense a rotational angle of a handle (steering wheel, not shown). Each road-wheel speed sensor 35FL, 35FR, 35RL or 35RR functions to sense a wheel speed of the corresponding road-wheel. An accelerator pedal AP functions to perform an accelerating/decelerating control of the vehicle by means of accelerator-pedal manipulation of the driver. The engine control unit 36 functions to control the engine 39 on the basis of the accelerator-pedal manipulation of the driver. Moreover, the engine control unit 36 functions to output an information about a torque generated in the engine 39 and a manipulated variable of the accelerator pedal AP (an amount of the accelerator-pedal manipulation), via the communication line (CAN). The automatic-transmission control unit 37 functions to control an automatic transmission (AT) 40. Moreover, the automatic-transmission control unit 37 functions to output a signal of gear position (i.e., a range position of the automatic transmission 40), via the communication line (CAN).

The P-line of the hydraulic unit 31 is connected with the left-front wheel cylinder W/C (FL) and the right-rear wheel cylinder W/C (RR). The S-line of the hydraulic unit 31 is connected with the right-front wheel cylinder W/C (FR) and the left-rear wheel cylinder W/C (RL). Moreover, a pump PP and a pump PS are provided respectively in the P-line and S-line, and are adapted to be driven by one motor M. As the pump in this embodiment, a plunger pump, a gear pump or the like is suitably employed and mounted. The plunger pump is more suitable in terms of cost reduction. The gear pump is more suitable in terms of smoothness (controllability).

A master cylinder M/C is connected through a pipeline (conduit) 11P or 11S (hereinafter simply described as pipeline 11) with a suction side of the pump PP or PS (hereinafter simply described as pump P). On each pipeline 11, namely so as to cut across each pipeline 11, a gate in-valve 2P or 2S which is a normally-closed type electromagnetic valve is provided.

On the pipeline 11, namely so as to cut across the pipeline 11, a check valve 6P or 6S (hereinafter simply described as check valve 6) is provided between the gate in-valve 2P or 2S (hereinafter simply described as gate in-valve 2) and the pump P. Each check valve 6 permits a flow of brake fluid in a direction toward the pump P from the gate in-valve 2, and prohibits a flow in the counter direction.

A discharge side of the pump P is connected through a pipeline 12P or 12S (hereinafter simply described as pipeline 12) with the wheel cylinders W/C. On each pipeline 12, namely so as to cut across each pipeline 12, a solenoid in-valve 4FL, 4RR, 4FR, 4RL (hereinafter simply described as solenoid in-valve 4) is provided which is a normally-open type electromagnetic valve corresponding to each wheel cylinder W/C.

On the pipeline 12, namely so as to cut across the pipeline 12, a check valve 7P or 7S (hereinafter simply described as check valve 7) is provided between the pump P and the solenoid in-valve 4. Each check valve 7 permits a flow of brake fluid in a direction toward the solenoid in-valve 4 from the pump P, and prohibits a flow in the counter direction.

Moreover on the pipeline 12, a pipeline 17FL, 17RR, 17FR, 17RL (hereinafter simply described as pipeline 17) is provided so as to make a detour around each solenoid in-valve 4. On the pipeline 17, namely so as to cut across the pipeline 17, a check valve 10FL, 10RR, 10FR, 10RL (hereinafter simply described as check valve 10) is provided. Each check valve 10 permits a flow of brake fluid in a direction toward the pump P from the wheel cylinder W/C, and prohibits a flow in the counter direction.

The master cylinder M/C is connected through a pipeline 13P, 13S (hereinafter simply described as pipeline 13) with the pipeline 12. The pipeline 12 and the pipeline 13 flow into each other at a point between the pump P and the solenoid in-valve 4. On each pipeline 13, namely so as to cut across each pipeline 13, a gate out-valve 3P or 3S (hereinafter simply described as gate out-valve 3) which is a normally-open type electromagnetic valve is provided.

Moreover on the pipeline 13, a pipeline 18P, 18S (hereinafter simply described as pipeline 18) is provided so as to make a detour around each gate out-valve 3. On the pipeline 18, namely so as to cut across the pipeline 18, a check valve 9P, 9S (hereinafter simply described as check valve 9) is provided. Each check valve 9 permits a flow of brake fluid in a direction toward the wheel cylinder W/C from the master cylinder M/C, and prohibits a flow in the counter direction.

On the suction side of the pump p, a reservoir 16P, 16S (hereinafter simply described as reservoir 16) is provided. The reservoir 16 is connected through a pipeline 15P, 15S (hereinafter simply described as pipeline 15) with the pump P. A check valve 8P, 8S (hereinafter simply described as check valve 8) is provided between the reservoir 16 and the pump P. Each check valve 8 permits a flow of brake fluid in a direction toward the pump P from the reservoir 16, and prohibits a flow in the counter direction.

The wheel cylinder W/C is connected through a pipeline 14P, 14S (hereinafter simply described as pipeline 14) with the pipeline 15. The pipeline 14 and the pipeline 15 flow into each other at a point between the check valve 8 and the reservoir 16. On the pipeline 14, namely so as to cut across each pipeline 14, a solenoid out-valve 5FL, 5RR, 5FR, 5RL (hereinafter simply described as solenoid out-valve 5) which is a normally-closed type electromagnetic valve is provided.

The brake control unit 32 performs a calculation for a normal brake control that is executed to follow the driver's brake-pedal manipulation, on the basis of input signals of the respective sensors, a brake-pedal manipulating state of the driver and the like; and performs a calculation for a vehicle behavior control or tire slip control using information of the vehicle, such as an antiskid brake system (ABS), a vehicle behavior stabilization control (VDC), an adaptive cruise control and an obstacle avoidance control. Thereby, the brake control unit 32 calculates a braking force (for all the road-wheels) necessary as the vehicle, and calculates a target value of braking force necessary for each road-wheel. For example, the brake control unit 32 functions as an antiskid brake control unit for performing the antiskid brake control (hereinafter, also referred to as ABS control).

The brake control unit 32 is also applied to a constant-speed running system for performing a so-called hill descent control (HDC). The hill descent control is for actuating an automatic braking (a fluid pressure brake and an engine brake are used in this embodiment) so as to prevent a vehicle speed from exceeding a target vehicle-speed value (e.g., 7 km/h) on a steep downhill road (e.g., inclination degree 10%). The hill descent control is activated, for example, when all the conditions (criteria) of: an ON state of a HDC switch 41 provided to be operated by the driver; the inclination degree≧10%; the vehicle speed≦a predetermined vehicle-speed value (e.g., 10 km/h); and a shift step (speed ratio) of the automatic transmission 40=a lowest step (first speed) are satisfied.

The brake control unit 32 includes a slip-state calculating section 32a, a road friction-coefficient calculating section 32b and a wheel acceleration calculating section 32c. The slip-state calculating section 32a functions to calculate an average speed of drive wheels (i.e., front road-wheels) as a slip state (skid state). The road friction-coefficient calculating section 32b functions to calculate a friction coefficient μ of road surface. The wheel acceleration calculating section 32c functions to calculate an average acceleration (average speed-increase rate) of the drive wheels. The average speed of drive wheels, the road friction coefficient μ and the average acceleration of drive wheels are suitably used as parameters for determining target braking-force values of the above-mentioned respective controls.

The brake control unit 32 produces an engine-torque request value during the ABS control, in order to suppress a brake torque of the engine 39, namely, in order to suppress an influence of the engine-brake torque against the ABS control. This engine-torque request value is a target engine torque (optimum engine-brake torque) that reduces the engine-brake torque. Then, the produced engine-torque request value is outputted to the engine control unit 36 as a request signal. The engine control unit 36 calculates a target engine rotational-speed value corresponding to the request signal derived from the brake control unit 32, and controls the engine torque by adjusting the engine rotational speed into the calculated target engine rotational-speed value. When the road friction-coefficient calculating section 32b determines that a jump of the friction coefficient μ from a high friction-coefficient value to a low friction-coefficient value has occurred during the ABS control, the brake control unit 32 outputs the engine-torque request value to the engine control unit 36 so as to accelerate the vehicle.

[Producing Process of Engine-torque Request Value]

Figure 3:
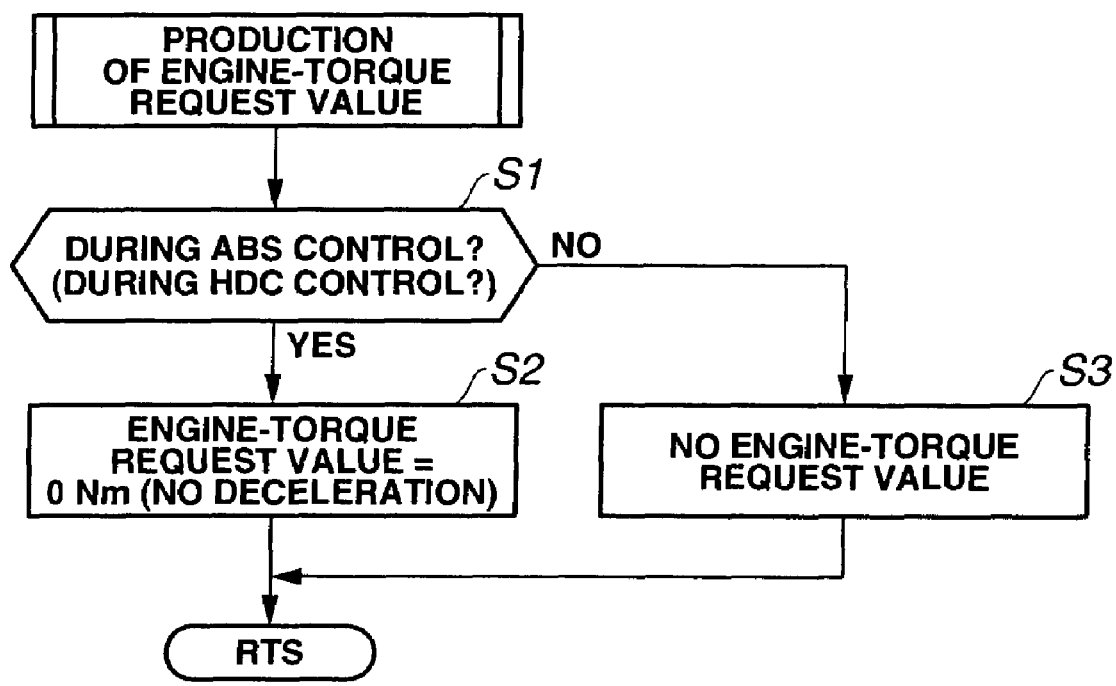
FIG. 3 is a flowchart showing a producing process of an engine-torque request value, that is executed in a brake control unit 32 in the first embodiment.

FIG. 3 is a flowchart showing a producing process of the engine-torque request value, that is executed in the brake control unit 32 in the first embodiment. This process is repeatedly executed at a predetermined period. Each step will now be explained. At step S1, it is judged whether or not the ABS control is being executed (i.e., whether or not the vehicle is under the ABS control). If YES at step S1, the program proceeds to step S2. If NO at step S1, the program proceeds to step S3. At step S2, the engine-torque request value is set at 0 Nm (no decelerating), and then, the program is returned. At step S3, the engine-torque request value is not set, and then, the program is returned.

Next, operations in the first embodiment will now be explained.

[Reducing Operation of Engine-brake Torque]

Figure 4:
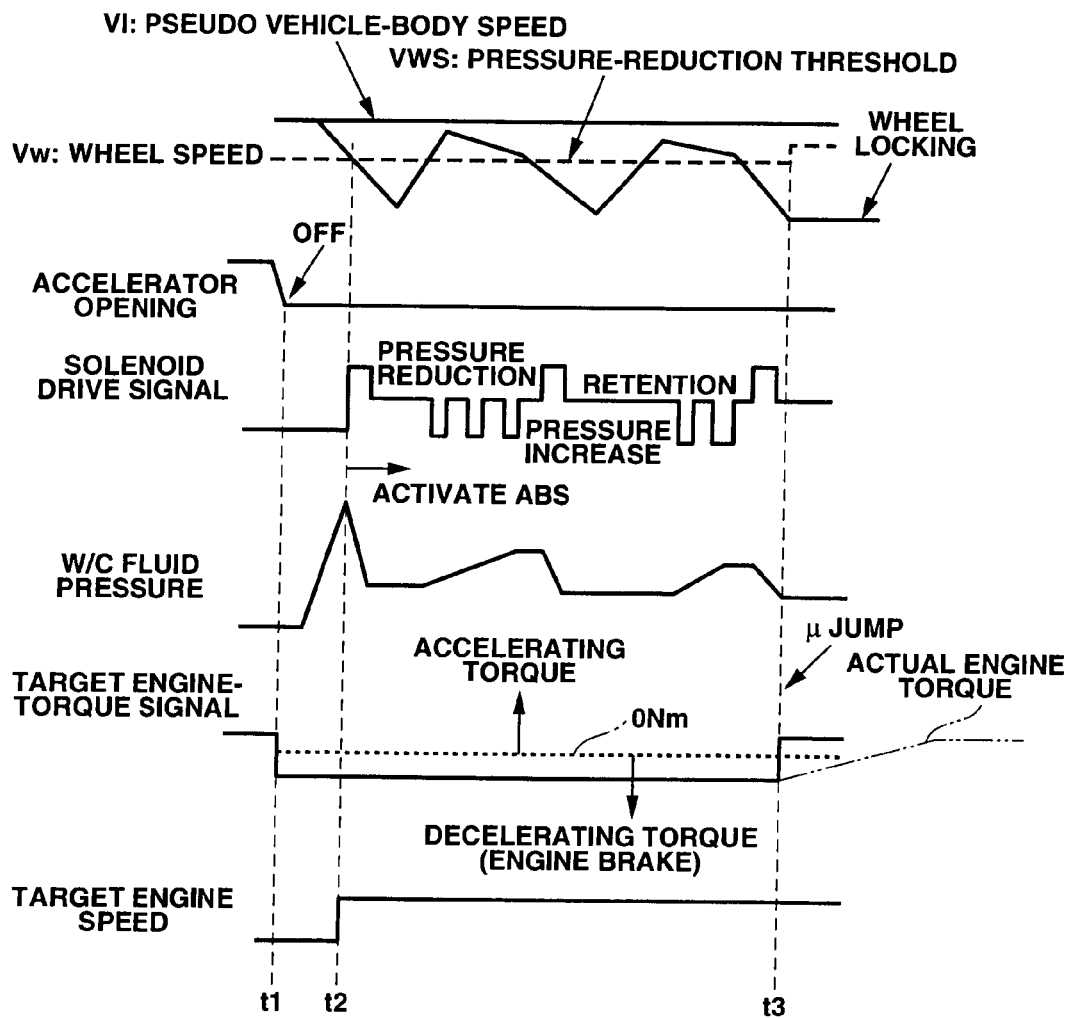
FIG. 4 is a time chart in the case of activation of ABS control in a comparative example.

FIG. 4 is a time chart in the case of activation of ABS control in a comparative example. In this comparative example, a vehicle is decelerated by engine brake from an accelerating running or constant-speed running. Hence, an engine control unit in the comparative example produces a target engine-torque signal representing a decelerating-side torque value when the accelerator opening becomes equal to 0 (OFF state of accelerator) at time point t1. Thereby, an engine-brake torque occurs. Then, even when the ABS control is activated at time point t2, the engine-brake torque is not varied because the target engine-torque signal remains constant.

In a control of the comparative example, a so-called idle up is performed for increasing a target engine speed in order to prevent a lower-side deviation of a pseudo (imaginary) vehicle-body speed VI during the ABS control. This "lower-side deviation of the pseudo vehicle-body speed VI" means a phenomenon in which the road-wheel speed becomes lower than an actual vehicle-body speed, and thereby, the pseudo vehicle-body speed VI set based on the road-wheel speed becomes lower than its proper value.

However, because only an idle speed is simply controlled in the above comparative example, the following problems might be caused due to an influence of the engine-brake torque against the ABS control. For example, when an ABS-in-gear braking (i.e., ABS control under the state where a gear of the automatic transmission is being engaged) is being executed in a diesel-engine vehicle having a relatively low idle speed, there is a possibility that the engine speed becomes below the (allowable-lowest) idle speed due to the road-wheel slip at the time of a low speed running of the vehicle. At this time, even if the engine control unit tries to maintain the idle speed by generating an accelerating-side engine torque, a rise time (responsibility) of the engine torque is slow as compared with a control cycle of the ABS control, so that an engine stall might be caused with the road-wheels locked.

Moreover, in the case that an excessive engine-brake torque occurs at the time of braking of the vehicle on a road having a low friction-coefficient, even if the pressure of brake fluid is reduced by means of the ABS control, the road-wheel speed is not sufficiently recovered. Thereby, an excessive slip continues so that a time interval for which the road wheel remains locked is elongated. As a result, a lateral force of the tire cannot be sufficiently secured so that it becomes difficult that a running stability is maintained.

Moreover, in the case that a jump of the friction coefficient μ from a high friction-coefficient value to a low friction-coefficient value occurs at time point t3 in FIG. 4, a decelerating torque continues to be outputted. At this time, even if the engine torque is increased based on the judgment that the road has a low friction-coefficient value at time point t3, an occurrence of accelerating torque is delayed (not in time). Thereby, there is a fear that an engine stall is caused due to a continuation of the road-wheel locking.

In contrast, in the first embodiment according to the present invention, the brake control unit 32 judges whether or not the ABS is under operation. If the ABS is under operation, the brake control unit 32 outputs an engine-torque request value for bringing the target engine torque equal to 0 Nm, to the engine control unit 36 (step S1→step S2). On the other hand, if the ABS is not under operation, the brake control unit 32 does not output the engine-torque request value (step S1→step S3).

That is, the brake control unit 32 outputs the engine-torque request value for reducing the engine brake torque to the engine control unit 36, from an initial stage of the ABS control. Thereby, the influence of engine brake torque is reduced from a beginning of the ABS control, and hence, the road-wheel-locking time during which the lateral force of tire cannot be sufficiently secured can be shortened. Therefore, the running stability can be ensured.

Figure 5:
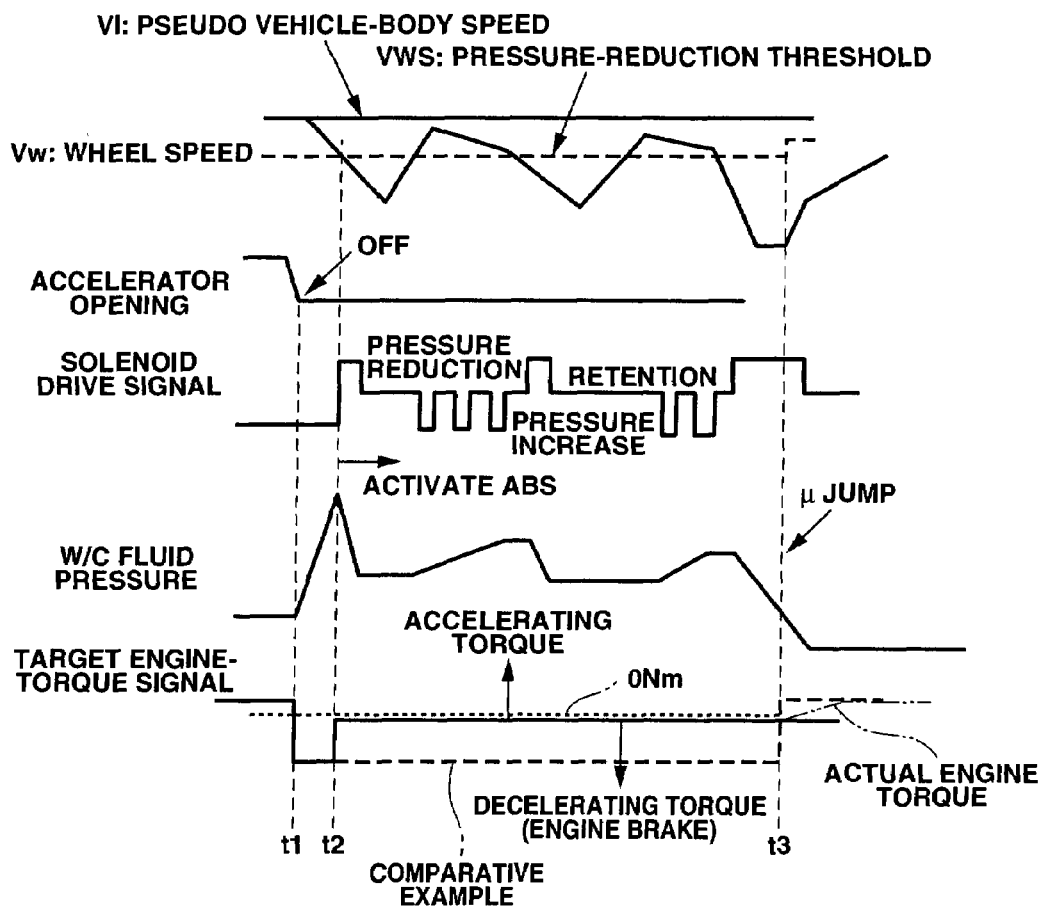
FIG. 5 is a time chart in the case of activation of the ABS control in the first embodiment.

FIG. 5 is a time chart in the case of activation of the ABS control in the first embodiment. A solid line showing the target engine-torque signal in FIG. 5 represents the first embodiment, and a dotted line showing the target engine-torque signal in FIG. 5 represents the comparative example. As shown in FIG. 5, the engine brake torque is eliminated by setting the target engine torque at 0 Nm from a start time of activation of the ABS, so that a locking tendency can be reduced. Accordingly, the influence of engine brake torque on the ABS control can be effectively suppressed to prevent the occurrence of engine stall.

Moreover, when the jump of the friction coefficient $\mu$ from a high friction-coefficient value to a low friction-coefficient value occurs at time point t3, the engine control unit 36 causes the engine 39 to output an engine torque for accelerating the vehicle in accordance with the request received from the brake control unit 32. The target engine-torque signal immediately before time point t3 is equal to 0. Hence, as shown by an alternate long and two short dashes line of FIG. 5, the engine torque can be made to rise quickly so that the road-wheel locking which is caused due to the pressure-reduction delay in the ABS can be reduced. Therefore, the recovery of road-wheel speed can be promptly attained so as to prevent the engine stall which is caused due to a continuation of road-wheel locking.

Next, effects and advantages according to the first embodiment will now be described.

(1) The braking/driving force control apparatus includes the left and right front wheels FL and FR configured to be driven by the output of the drive source (the engine 39); the hydraulic unit 31 configured to control a braking force to be applied to the wheels, in accordance with the state of the vehicle; and the brake control unit 32 configured to control the hydraulic unit 31. The brake control unit 32 reduces the brake torque of engine 39 (engine-brake torque) when the hydraulic unit 31 actually applies the braking force to at least the left and right front wheels FL and FR. Accordingly, the influence of engine-brake torque against the brake control (such as ABS or HDC) can be effectively suppressed.

(2) The brake control unit 32 calculates the engine-torque request value, and outputs the engine-torque request value to the engine control unit 36. The engine control unit 36 controls the engine 39 to attain the engine-torque request value. Accordingly, the engine torque appropriate for the brake control can be obtained to improve a braking performance. Moreover, the brake control unit 32 sends and receives data to/from the engine control unit 36 by way of CAN signals passing through the already-existing CAN communication line 38. Therefore, the above mentioned advantageous effects are achieved without adding new signal communication lines.

(3) The engine-torque request value is equal to 0 Nm when the hydraulic unit 31 applies the braking force to at least the drive wheels. Accordingly, the engine torque becomes substantially equal to 0 Nm so that the braking performance can be improved.

(4) The braking/driving force control apparatus further includes the road friction-coefficient calculating section 32b for calculating the friction coefficient $\mu$ of road surface; and the engine control unit 36 is configured to cause the engine 39 to output the engine torque for accelerating the vehicle when the calculated road friction coefficient $\mu$ has varied from a high friction-coefficient value to a low friction-coefficient value. Accordingly, the engine stall can be avoided at the time of jump of the friction coefficient $\mu$ from a road having a high friction coefficient to a road having a low friction coefficient.

(5) The hydraulic unit 31 is configured to be applied to the constant-speed running system for performing an automatic braking at the time of hill-descent running of the vehicle. Accordingly, the engine-brake torque is controlled at the time of low-speed running of the vehicle. Thereby, the engine stall can be suppressed so that a very-low-speed running of the vehicle can be stably achieved on a downhill road.

(6) The braking/driving force control apparatus includes the hydraulic unit 31 configured to control a braking force to be applied to the road-wheels in accordance with the state of vehicle; the brake control unit 32 configured to control the hydraulic unit 31; and the engine control unit 36 configured to control the state of the engine 39, so as to reduce the engine-brake torque in accordance with the output signal of the brake control unit 32 when the hydraulic unit 31 actuates at least the drive wheels (left and right front wheels FL and FR) among the four wheels. Accordingly, the influence of engine-brake torque on the brake control (such as ABS or HDC) can be effectively suppressed.

(7) The brake control unit 32 is configured to calculate the engine-torque request value, and to output a signal of the engine-torque request value; and the engine control unit 36 is configured to control the engine 39 so as to attain the engine-torque request value. Accordingly, the engine torque appropriate for the brake control can be obtained to improve the braking performance.

[Second Embodiment]

In a second embodiment according to the present invention, the gear position (range position) of the automatic transmission 40 is maintained in neutral, during the execution of the ABS control. A schematic overall structure in the second embodiment is similar as the structure shown by FIGS. 1 and 2 in the first embodiment. Therefore, illustrations and explanations thereof will be omitted for the purpose of simplification of the disclosure.

The brake control unit 32 transmits an automatic-transmission control request signal for forcing the gear position of automatic transmission 40 to become in neutral during the ABS control, to the automatic-transmission control unit 37. The automatic-transmission control unit 37 sets the automatic transmission 40 in neutral position in accordance with the automatic-transmission control request signal received from the brake control unit 32.

[Producing Process of Engine-torque Request Value]

Figure 6:
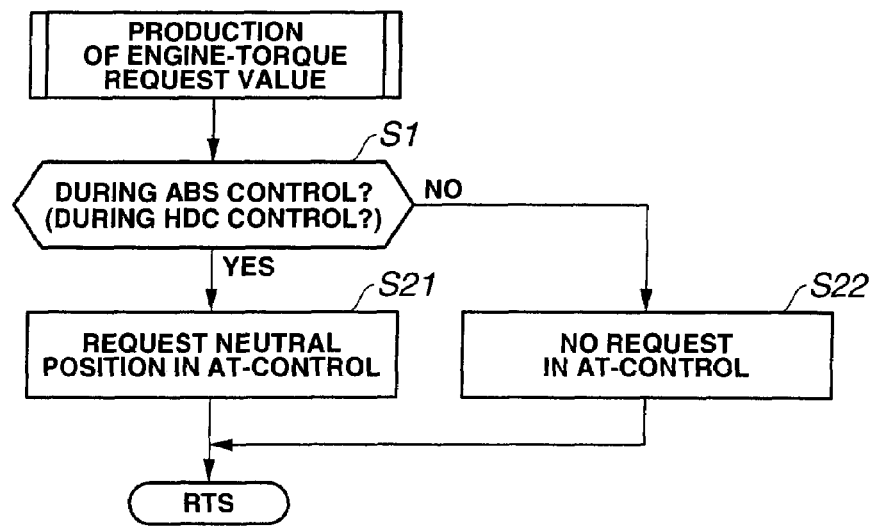
FIG. 6 is a flowchart showing a producing process of the engine-torque request value, that is executed in the brake control unit 32 in a second embodiment according to the present invention.

FIG. 6 is a flowchart showing a producing process of the engine-torque request value, that is executed in the brake control unit 32 in the second embodiment. Each step will now be explained. The steps given the same step numbers as the flowchart of FIG. 3 execute the same processing as those of FIG. 3, and explanations thereof will be omitted. At step S21, the brake control unit 32 produces the automatic-transmission control request for bringing the gear position into neutral, and then, the program is returned. At step S22, the brake control unit 32 does not produce the automatic-transmission control request, and then, the program is returned.

Next, operations in the second embodiment will now be explained. [Reducing Operation of Engine-brake Torque]

Figure 7:
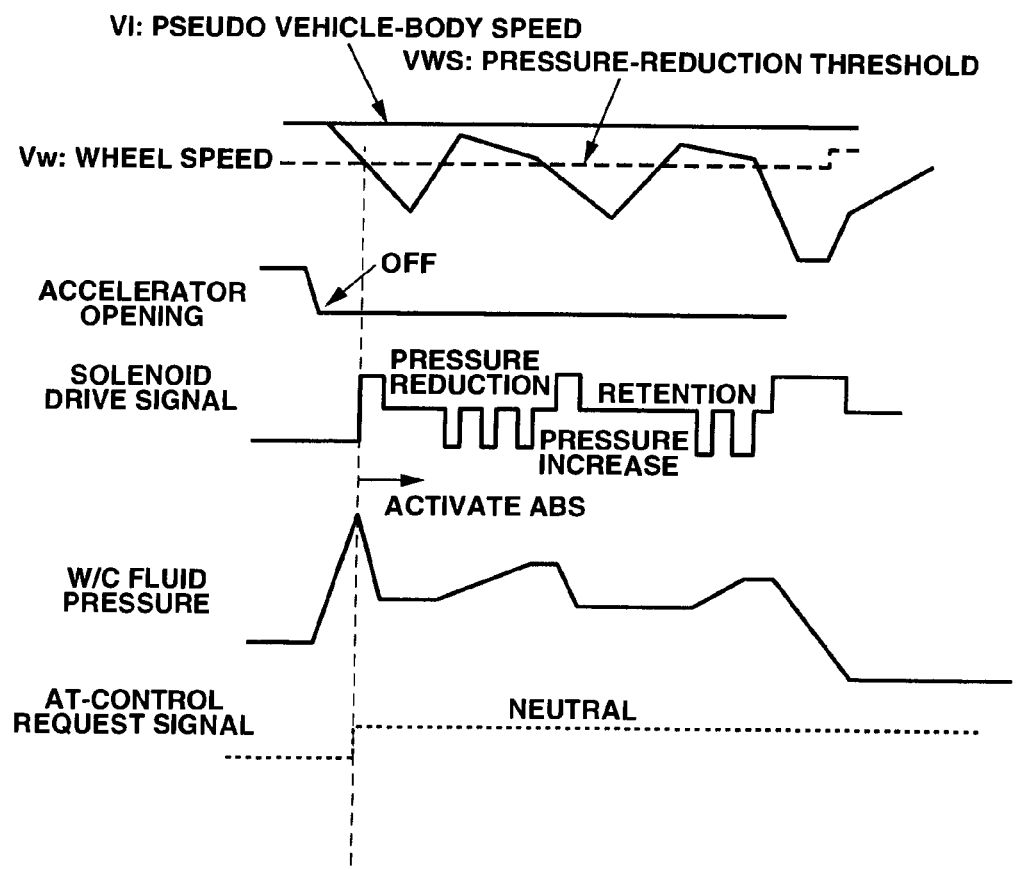
FIG. 7 is a time chart in the case of activation of the ABS control in the second embodiment.

FIG. 7 is a time chart in the case of activation of the ABS control in the second embodiment. In the second embodiment, the gear position of the automatic transmission 40 becomes in neutral concurrently with a start time of activation of the ABS control (step S1→step S21). Thereby, the engine brake torque becomes substantially equal to 0 Nm, so that the locking tendency of wheel can be reduced in the same manner as the first embodiment. Accordingly, the influence of engine brake torque at the time of execution of ABS control can be effectively suppressed so as to avoid the occurrence of engine stall.

Next, effects and advantages according to the second embodiment will now be described.

(8) The reduction of the engine-brake torque is conducted by setting the gear position (transmission ratio) of the automatic transmission 40 in neutral. Accordingly, the influence of engine-brake torque against the brake control can be effectively suppressed.

[Third Embodiment]

In a third embodiment according to the present invention, the engine brake torque is controlled in accordance with a slip state of the right and left front road-wheels FL and FR. A schematic overall structure in the third embodiment is similar as the structure shown by FIGS. 1 and 2 in the first embodiment. Therefore, illustrations and explanations thereof will be omitted for the purpose of simplification of the disclosure.

[Producing Process of Engine-torque Request Value]

Figure 8:
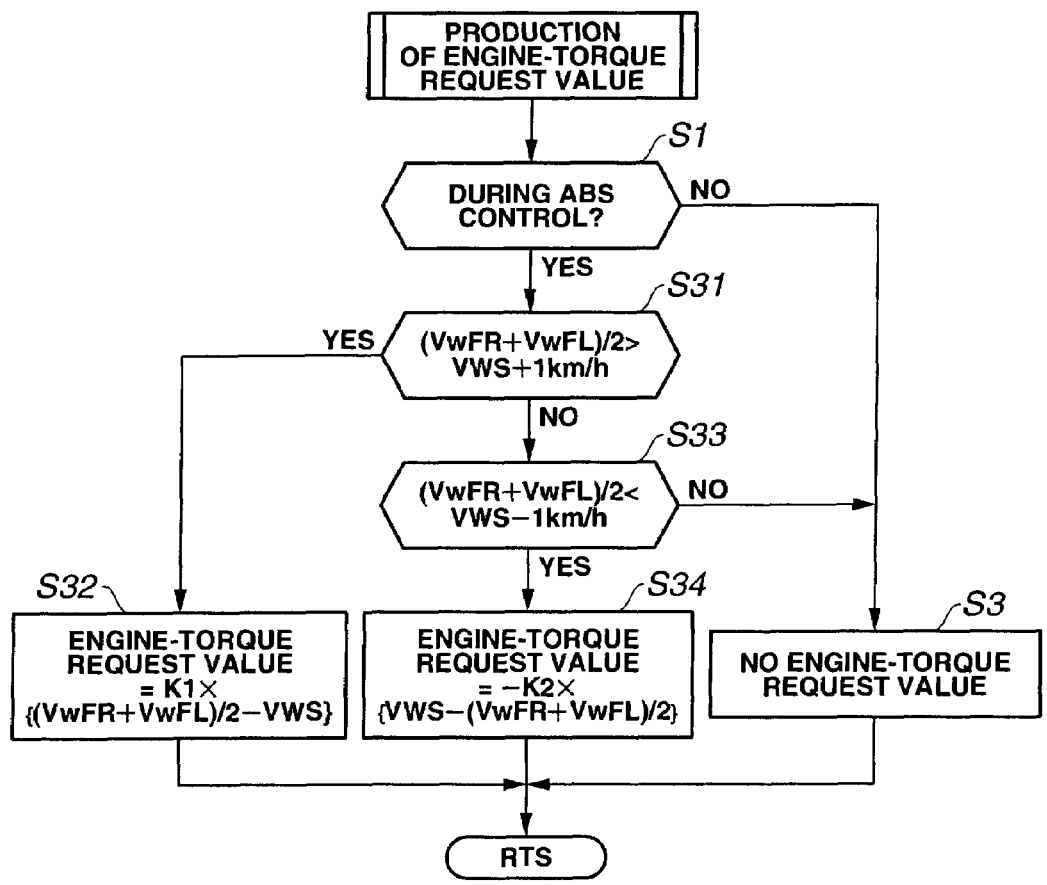
FIG. 8 is a flowchart showing a producing process of the engine-torque request value, that is executed in the brake control unit 32 in a third embodiment according to the present invention.

FIG. 8 is a flowchart showing a producing process of the engine-torque request value, that is executed in the brake control unit 32 in the third embodiment. Each step will now be explained. The steps given the same step numbers as the flowchart of FIG. 3 execute the same processing as those of FIG. 3, and explanations thereof will be omitted.

At step S31, it is judged whether or not a drive-wheel average speed (i.e., an average value of a right-front wheel speed VwFR and a left-front wheel speed VwFL) calculated by the slip-state calculating section 32a is greater than a value obtained by adding a predetermined value (e.g., 1 km/h) to a target-slip-ratio speed VWS. This target-slip-ratio speed VWS is a road-wheel speed capable of attaining a target slip ratio. If YES at step S31, the program proceeds to step S32. If NO at step S31, the program proceeds to step S33.

At step S32, the engine-torque request value (a first engine-brake torque value) is calculated from a following formula ①, and the program is returned.

Engine-torque Request Value=$K1 \times \{(VwFR+VwFL)/2-VWS\}$     ① where, K1 denotes a coefficient.

At step S33, it is judged whether or not the drive-wheel average speed is smaller than a value obtained by subtracting a predetermined value (e.g., 1 km/h) from the target-slip-ratio speed VWS. If YES at step S33, the program proceeds to step S34. If NO at step S33, the program proceeds to step S3. At step S34, the engine-torque request value (a second engine-brake torque value) is calculated from a following formula ②, and the program is returned.

Engine-torque Request Value=$-K2 \times \{VWS-(VwFR+VwFL)/2\}$     ② where, K2 denotes a coefficient.

It is noted that a range of the target slip ratio which corresponds to "the target-slip-ratio speed VWS±1 km/h" in the third embodiment corresponds to "first slip ratio value" according to the present invention.

Next, operations in the third embodiment will now be explained. [Varying Operation of Engine-brake Torque According to Slip Ratio]

In the third embodiment, the drive-wheel average speed (VwFR+VwFL)/2 is calculated during the ABS control. Then, this drive-wheel average speed is compared with the value obtained by adding or subtracting the offset value (predetermined value) to or from the target-slip-ratio speed VWS. If it is determined that the slip (degree) is small (as compared with its target), the engine-torque request value is set as an engine-brake torque value according to the difference between the target-slip-ratio speed VWS and the drive-wheel average speed (step S1→step S31→step S33→step S34). On the other hand, if it is determined that the slip (degree) is excessive, the engine-torque request value is set as an accelerating torque value according to the difference between the target-slip-ratio speed VWS and the drive-wheel average speed (step S1→step S31→step S32).

Figure 9:
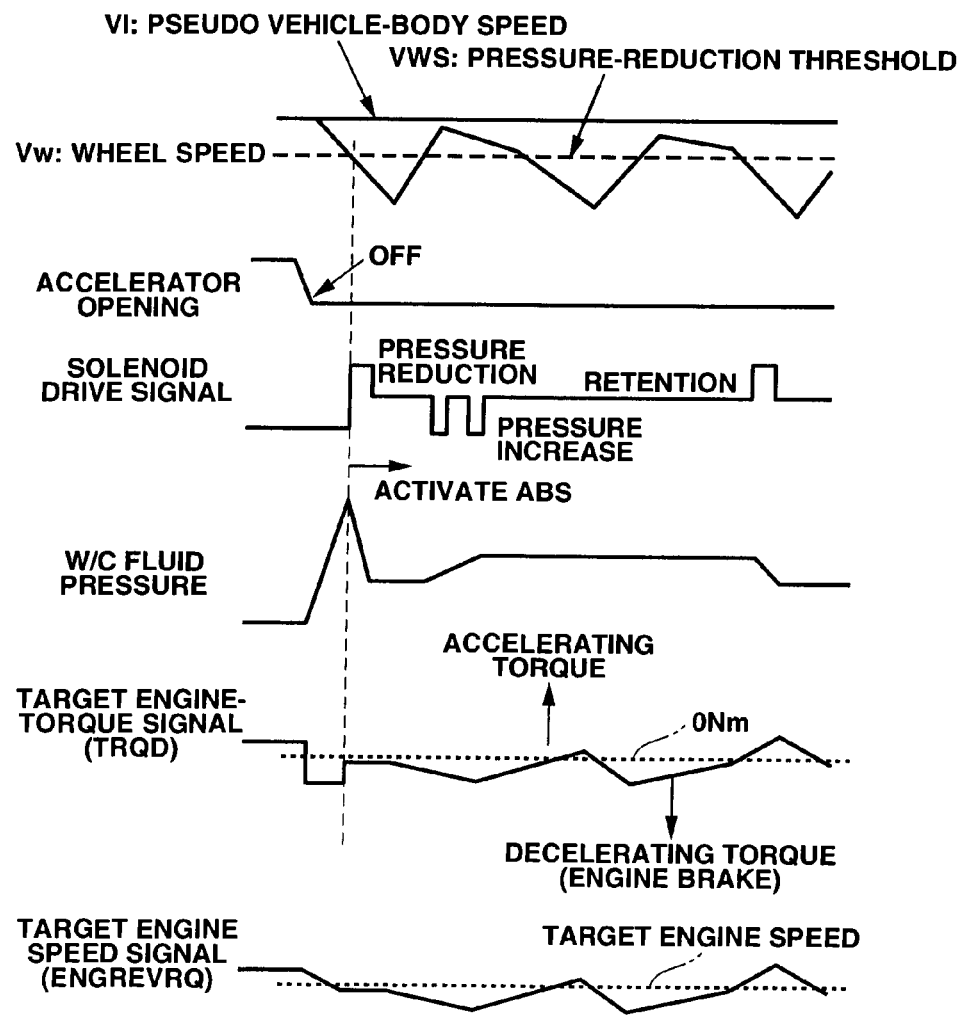
FIG. 9 is a time chart in the case of activation of the ABS control in the third embodiment.

FIG. 9 is a time chart in the case of activation of the ABS control in the third embodiment. In the third embodiment, the engine control unit 36 controls the engine torque on the basis of the engine-torque request value produced by the brake control unit 32. That is, a target engine torque value is set so as to cause the drive-wheel average speed to become the target-slip-ratio speed VWS, namely to bring the slip ratio of the drive wheels into the "first slip ratio value" (within a tolerance of the target slip ratio). Thus, the engine torque is adjusted.

Generally, in the ABS control, the fluid pressure of wheel cylinder is decreased when the slip ratio of drive wheels exceeds its proper range, namely, when the slip ratio of drive wheels exceeds an upper limit of tolerance of the target slip ratio; and the fluid pressure of wheel cylinder is increased when the slip ratio of drive wheels becomes below its proper range, namely, when the slip ratio of drive wheels becomes below a lower limit of tolerance of the target slip ratio. Further, the fluid pressure of wheel cylinder is maintained when the slip ratio is within its proper range.

Hence, in the third embodiment, by adjusting the engine torque so as to place the slip ratio within its proper range, a frequency of the increase/decrease operations of fluid pressure of each wheel cylinder W/C can be reduced. That is, in the third embodiment, because the slip state of drive wheel is supplementarily adjusted by the engine torque, a load for the ABS control in the brake control unit 32 can be reduced.

As a result, a valve operating noise of the hydraulic unit 31 and a fluid-pressure variation of the wheel cylinder W/C can be reduced, and thereby actuation noises and vibrations of the brake system can be reduced. Moreover, a braking distance can be shortened because of the suppression of excessive slip. Therefore, the braking force as intended by the driver can be obtained to improve a deceleration feeling.

Next, effects and advantages according to the third embodiment will now be described.

(9) The braking/driving force control apparatus further includes the slip-state calculating section 32a configured to calculate the slip state of the wheel; and the brake control unit 32 is configured to control the engine-brake torque in accordance with the calculated slip state of the wheel, so as to set the engine-torque request value at the first engine-brake torque value when the slip ratio of the wheel is greater than or equal to the "first slip ratio value", and set the engine-torque request value at the second engine-brake torque value when the slip ratio is smaller than the "first slip ratio value". This second engine-brake torque value is greater than the first engine-brake torque value. Accordingly, the engine-torque request value can be set according to the slip state so that a shortening of the braking distance can be attained.

(10) The first engine-brake torque value is an accelerating engine torque level (acceleration-side value), and the second engine-brake torque value is a decelerating engine torque level (deceleration-side value). Accordingly, the braking performance can be improved.

(11) The braking/driving force control apparatus includes the brake control unit 32 as the antiskid brake control unit configured to perform the antiskid brake control for increasing or decreasing wheel-cylinder fluid pressures in accordance with the slip state of the wheels; and the engine control unit 36 configured to control the output of the engine 39 so as to adjust the engine-brake torque in accordance with the slip state of the wheels when the ABS control is acting on at least the drive wheels. Accordingly, the influence of engine-brake torque can be effectively suppressed against the brake control.

[Fourth Embodiment]

In a fourth embodiment according to the present invention, the engine brake torque is controlled according to an acceleration (speed-increase rate) of the road wheel. A schematic overall structure in the fourth embodiment is similar as the structure shown by FIGS. 1 and 2 in the first embodiment. Therefore, illustrations and explanations thereof will be omitted for the purpose of simplification of the disclosure.

[Producing Process of Engine-torque Request Value]

FIG. 10 is a flowchart showing a producing process of the engine-torque request value, that is executed in the brake control unit 32 in the fourth embodiment. Each step will now be explained. The steps given the same step numbers as the flowchart of FIG. 3 execute the same processing as those of FIG. 3, and explanations thereof will be omitted.

At step S41, the engine-torque request value is set at X Nm, and then, the program proceeds to step S42. This X denotes an initial value, and is a target engine torque value which causes the slip ratio of drive wheels to become near the target slip ratio or causes a road-wheel deceleration (speed-decrease rate) to become near its target deceleration. At step S42, it is judged whether or not a drive-wheel average acceleration (i.e., an average value of a right-front wheel acceleration VwdFR and a left-front wheel acceleration VwdFL) calculated by the wheel acceleration calculating section 32c is greater than 1.0 g. If YES at step S42, the program proceeds to step S44. If NO at step S42, the program proceeds to step S43.

At step S43, it is judged whether or not the drive-wheel average acceleration is smaller than −1.0 g. If YES at step S43, the program proceeds to step S45. If NO at step S43, the program is returned. At step S44, the engine-torque request value is set at −X1 Nm, and then, the program is returned. This X1 denotes is a target engine torque value which causes the slip ratio of drive wheels to become near the target slip ratio or causes the wheel deceleration to become near the target deceleration. At step S45, the engine-torque request value is set at X2 Nm, and then the program is returned. This X2 is a target engine torque value which causes the slip ratio of drive wheels to become near the target slip ratio or causes the wheel deceleration to become near the target deceleration.

Next, operations in the fourth embodiment will now be explained.

[Varying Operation of Engine-brake Torque According to Deceleration]

In the fourth embodiment, the engine-torque request value is varied according to the drive-wheel average acceleration. When the drive-wheel average acceleration has a decelerating tendency (tendency to decrease the drive-wheel speed), the engine-torque request value is set at X2 Nm which is an accelerating-side engine torque value (step S1→step S41→step S42→step S43→step S45). On the other hand, when the drive-wheel average acceleration has an accelerating tendency (tendency to increase the drive-wheel speed), the engine-torque request value is set at −X1 Nm which is a decelerating-side engine torque value (step S1→step S41→step S42→step S44). That is, in the fourth embodiment, the target engine torque is set so as to bring the slip ratio of drive wheel close to the target slip ratio, or so as to bring the wheel deceleration close to the target deceleration. Thus, the engine torque is adjusted.

Next, effects and advantages according to the fourth embodiment will now be described.

(12) The brake control unit 32 includes the wheel-acceleration calculating section 32c configured to calculate the acceleration of the wheel; and the engine-torque request value is set as an accelerating engine-torque value when the calculated wheel acceleration has the tendency to decrease the speed of wheel, and is set as a decelerating engine-torque value when the calculated wheel acceleration has the tendency to increase the speed of wheel. Accordingly, the engine-torque request value can be set according to the tendency in acceleration of drive wheel so that the braking distance can be shortened.

(13) The braking/driving force control apparatus includes the antiskid brake control unit (brake control unit 32) configured to perform the antiskid brake control for increasing or decreasing the wheel-cylinder fluid pressures in accordance with the slip state of the wheels; and the engine control unit 36 configured to control the output of the engine 39, so as to adjust the engine-brake torque in accordance with the slip state of wheels or in accordance with the accelerating/decelerating state of the wheels, when the antiskid brake control is acting on at least the drive wheels. Accordingly, the influence of engine-brake torque on the brake control can be effectively suppressed.

[Fifth Embodiment]

In a fifth embodiment according to the present invention, the engine brake torque is controlled by way of PD control, on the basis of a difference between the speed of drive wheel and a target speed of drive wheel and a difference between a recovering acceleration of the drive wheel and a target recovering acceleration of the drive wheel. A schematic overall structure in the fifth embodiment is similar as the structure shown by FIGS. 1 and 2 in the first embodiment. Therefore, illustrations and explanations thereof will be omitted for the purpose of simplification of the disclosure.

[Producing Process of Engine-torque Request Value]

FIG. 11 is a flowchart showing a producing process of the engine-torque request value, that is executed in the brake control unit 32 in the fifth embodiment. Each step will now be explained. The steps given the same step numbers as the flowchart of FIG. 3 execute the same processing as those of FIG. 3, and explanations thereof will be omitted.

At step S51, the engine-torque request value is set based on a following formula (3), and the program is returned.

$$\text{Engine-torque Request Value} = kp \times (Vw - Vw^*) + kd \times (VwD30 - VwD30^*) \quad (3)$$

where, kp denotes a proportional gain, kd denotes a derivative gain, Vw denotes a road-wheel speed, Vw* denotes a target road-wheel speed, VwD30 denotes a road-wheel recovering acceleration (i.e., an acceleration at which the road-wheel speed Vw recovers toward the vehicle-body speed by means of pressure reduction), and VwD30* denotes a target road-wheel recovering acceleration.

As mentioned above, in the fifth embodiment, the engine-torque request value is set according to the difference between the road-wheel speed Vw and the target road-wheel speed Vw*, and the difference between the road-wheel recovering acceleration VwD30 and the target road-wheel recovering acceleration VwD30*. Accordingly, the road-wheel speed Vw and the road-wheel recovering acceleration VwD30 can be made to respectively approach the target road-wheel speed Vw* and the target road-wheel recovering acceleration VwD30* provided for the ABS control. Therefore, a shortening of the braking distance can be achieved because of the suppression of excessive slip.

[Sixth Embodiment]

In a sixth embodiment according to the present invention, the engine brake torque is controlled according to the target deceleration. A schematic overall structure in the sixth embodiment is similar as the structure shown by FIGS. 1 and 2 in the first embodiment. Therefore, illustrations and explanations thereof will be omitted for the purpose of simplification of the disclosure.

[Producing Process of Engine-torque Request Value]

Figure 12:
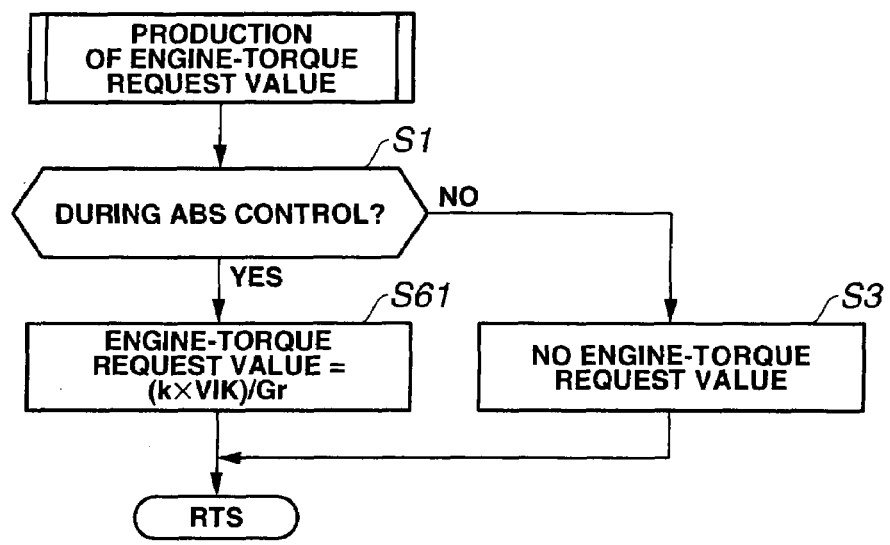
FIG. 12 is a flowchart showing a producing process of the engine-torque request value, that is executed in the brake control unit 32 in a sixth embodiment according to the present invention.

FIG. 12 is a flowchart showing a producing process of the engine-torque request value, that is executed in the brake control unit 32 in the sixth embodiment. Each step will now be explained. The steps given the same step numbers as the flowchart of FIG. 3 execute the same processing as those of FIG. 3, and explanations thereof will be omitted.

At step S61, the engine-torque request value is set based on a following formula (4), and the program is returned.

$$\text{Engine-torque Request Value} = (k \times VIK)/Gr \quad (4)$$

where, k denotes a coefficient, VIK denotes a deceleration (speed-decrease rate) of the vehicle, and Gr denotes a gear ratio between the engine 39 and the road wheel.

Figure 13:
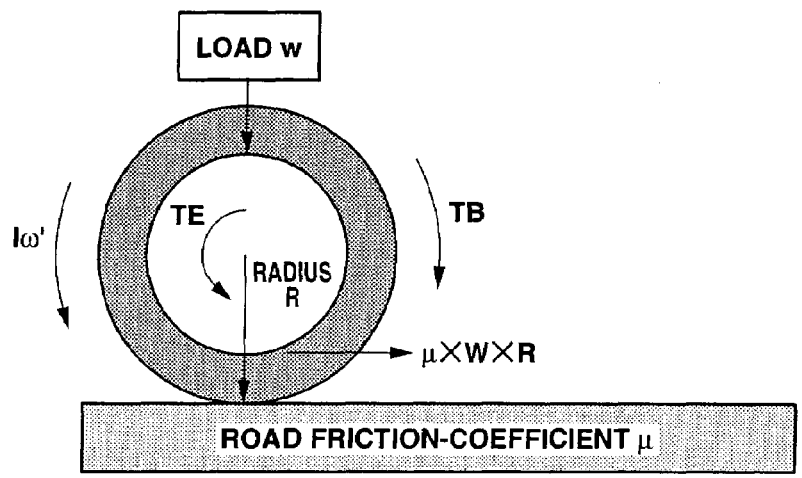
FIG. 13 is a view showing a state of a road-wheel during the execution of ABS control.

FIG. 13 is a view showing a state of the road-wheel (drive wheel) during the execution of ABS control. A drive torque (engine torque×gear ratio Gr) TE, a brake torque TB, and a road-surface reaction torque (a torque by a reaction force of road surface) $\mu \times w \times R$ are respectively applied to the road-wheel. $\mu$ denotes the road friction-coefficient, w denotes a road-wheel load, and R denotes an effective radius of the road-wheel. Accordingly, a following formula (5) is established, where I denotes an inertia moment, and $\omega'$ denotes the road-wheel rotational acceleration.

$$I\omega' = \mu wR + TE - TB \quad (5)$$

If the target deceleration is determined as a magnitude of the road friction-coefficient $\mu$, by setting the engine-toque request value so as to strike a balance between the brake torque TB and the road-surface reaction torque $\mu \times w \times R$, a frequency of substantive actuations (pressure increases and pressure reductions) of ABS is reduced so that the actuation noises and vibrations of the brake system can be reduced. Moreover, the braking distance can be shortened because of the suppression of excessive slip. Therefore, the braking force as intended by the driver can be obtained to improve the deceleration feeling. That is, in the sixth embodiment, the engine-torque request value is set based on the formula (4) to satisfy the relation: $\mu = VIK$ by setting as: $TB = \mu \times w \times R$. Therefore, the reduction of actuation noises and vibrations of the brake system and also the improvement of deceleration feeling can be achieved.

[Seventh Embodiment]

In a seventh embodiment according to the present invention, the brake control unit 32 requests or sends a target engine speed value directly to the engine control unit 36. A schematic overall structure in the seventh embodiment is similar as the structure shown by FIGS. 1 and 2 in the first embodiment. Therefore, illustrations and explanations thereof will be omitted for the purpose of simplification of the disclosure.

The brake control unit 32 produces an engine-speed request value which is the target engine speed value in accordance with the target-slip-ratio speed VWS, during the ABS control. Then, the brake control unit 32 outputs the produced engine-speed request value to the engine control unit 36 as the request signal. The engine control unit 36 controls the engine speed in accordance with the request signal derived from the brake control unit 32.

[Producing Process of Engine-speed Request Value]

Figure 14:
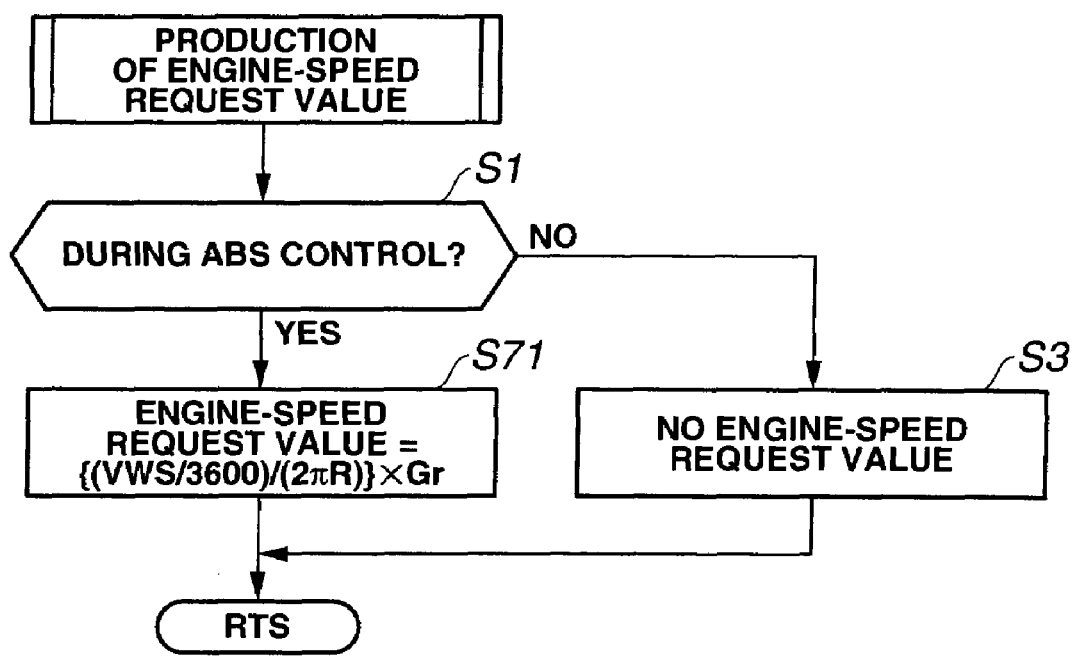
FIG. 14 is a flowchart showing a producing process of an engine-speed request value, that is executed in the brake control unit 32 in a seventh embodiment according to the present invention.

FIG. 14 is a flowchart showing a producing process of the engine-speed request value, that is executed in the brake control unit 32 in the seventh embodiment. Each step will now be explained. The steps given the same step numbers as the flowchart of FIG. 3 execute the same processing as those of FIG. 3, and explanations thereof will be omitted.

At step S71, the engine-speed request value is set based on a following formula (6), and the program is returned.

$$\text{Engine-speed Request Value} = \{(VWS/3600)/(2\pi R)\} \times Gr \quad (6)$$

That is, when trying to control the engine torque according to the slip state as explained in the third embodiment, the target engine speed can be determined from the target-slip-ratio speed VWS by using the gear ratio Gr and the wheel effective radius R. Hence, in the seventh embodiment, a calculation load of the engine control unit 36 can be lightened since the brake control unit 32 directly calculates the target engine speed.

Moreover, in the seventh embodiment, since the target engine speed is set to bring the average speed of drive wheels to the target-slip-ratio speed VWS, the execution frequency of the pressure increases and decreases of wheel cylinder W/C is lowered so that the valve operating noise of the hydraulic unit 31 and the fluid-pressure variation of the wheel cylinder W/C can be reduced. Therefore, the reduction of actuation noises and vibrations of the brake system and also the improvement of the deceleration feeling can be achieved.

[Other Embodiments]

Although the invention has been described above with reference to certain embodiments of the invention, the invention is not limited to the embodiments described above. Modifications and variations of the embodiments described above will occur to those skilled in the art in light of the above teachings. For example, in the first embodiment, the example has been explained that the engine control unit 36 controllably reduces the engine brake torque according to the output signals of the brake control unit 32 when the hydraulic unit 31 is actuating at least left and right front wheels FL and FR (functioning as the drive wheels) among the respective road-wheels. However at this time, the engine control unit 36 may controllably increase the engine speed.

Moreover, in the second embodiment, the example has been explained that the gear position of the automatic transmission 40 is made to be in neutral for the execution time of ABS control. However, a structure may be employed in which a clutch provided inside the automatic transmission 40 or provided between the engine 39 and the left and right front wheels FL and FR is disengaged. Alternatively, a structure may be employed in which the shift step (speed ratio) of the automatic transmission 40 is shifted to a higher-speed side (high-speed side step of speed ratio). Moreover, the transmission which can be used in the present invention is not limited to a step automatic transmission, and may be a continuously variable transmission or an automated manual transmission.

Figure 15:
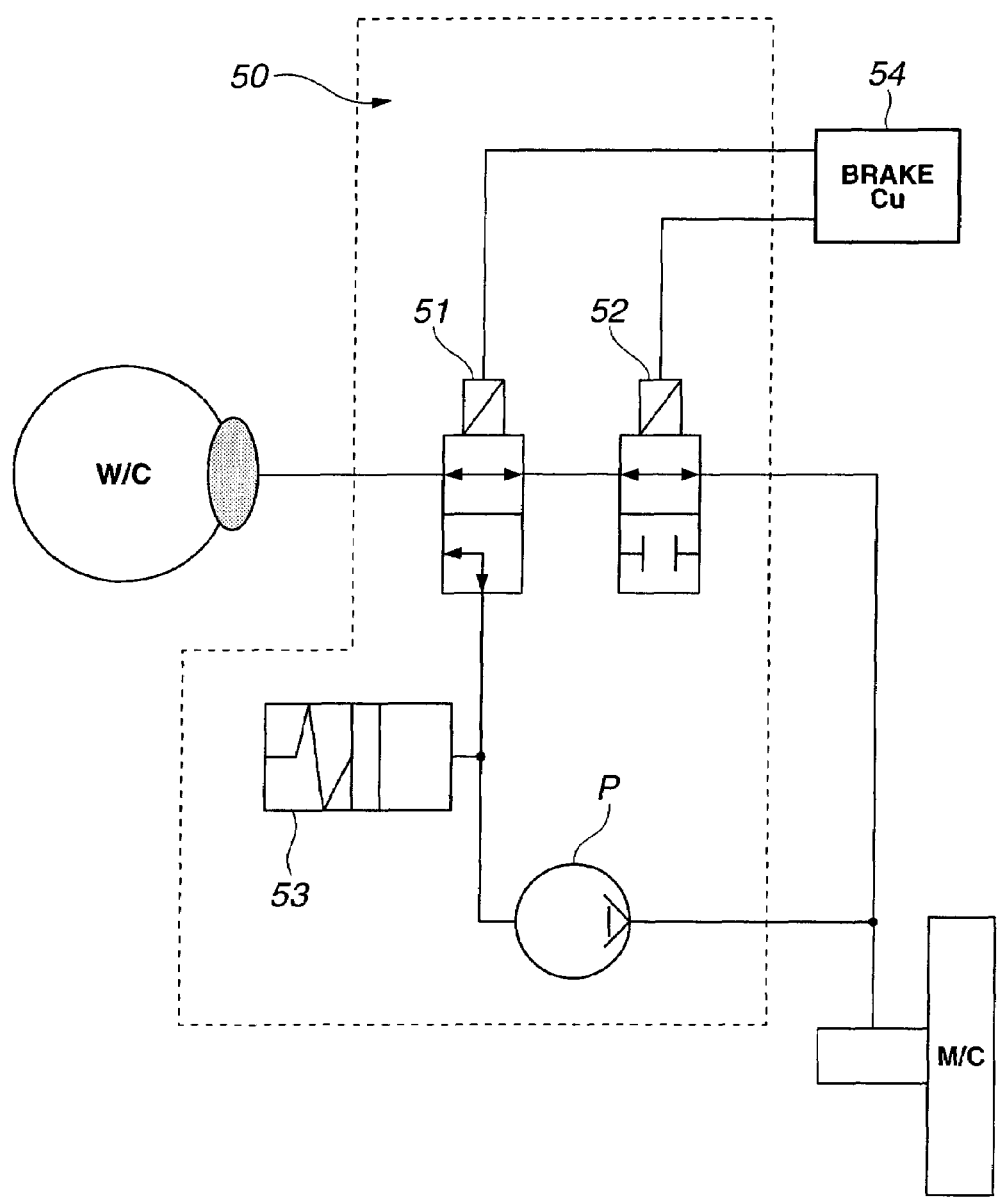
FIG. 15 is a view showing one example of hydraulic unit.

Moreover in the present invention, any hydraulic unit capable of performing the ABS control can be employed. FIG. 15 is a view showing one example of the hydraulic unit for the ABS control. A hydraulic unit 50 includes a pump P, first and second changeover valves 51 and 52, and a reservoir 53. The first and second changeover valves 51 and 52 are respectively driven based on commands from a brake control unit 54. The second changeover valve 52 of normally-open type switches between communication and blocking between a master cylinder M/C and the first changeover valve 51. The first changeover valve 51 switches between a communication between a wheel cylinder W/C and the pump P, and a communication between the wheel cylinder W/C and the second changeover valve 52. The reservoir 53 is provided between the pump P and the first changeover valve 51, and temporarily retains working fluid of the wheel cylinder W/C at the time of pressure reduction. By applying the present invention also to a vehicular braking/driving force control apparatus equipped with such a hydraulic unit, the similar operations and advantages as the above-explained respective embodiments are obtainable.

Moreover, in the respective embodiments, an electric motor can be used as the drive source in place of the engine.

This application is based on prior Japanese Patent Application No. 2008-180006 filed on Jul. 10, 2008. The entire contents of this Japanese Patent Application are hereby incorporated by reference.

The scope of the invention is defined with reference to the following claims.

What is claimed is:

1. A braking/driving force control apparatus for a vehicle, comprising:
a drive wheel configured to be driven by an output of a drive source;
a brake unit configured to control a braking force to be applied to the drive wheel, in accordance with a state of the vehicle; and
a brake control unit configured to control the brake unit, and configured to reduce a brake torque of the drive source irrespective of a slip ratio of the drive wheel when the brake unit actually applies the braking force to at least the drive wheel of the vehicle.

2. The braking/driving force control apparatus as claimed in claim 1, wherein
the drive source is an engine;
the braking/driving force control apparatus further comprises an engine control unit configured to control an output of the engine;
the brake control unit is further configured to calculate a value of an optimum engine-brake torque as an optimum engine-brake torque value, and to output the optimum engine-brake torque value to the engine control unit; and
the engine control unit is further configured to control the engine to attain the optimum engine-brake torque value.

3. The braking/driving force control apparatus as claimed in claim 2, wherein
the optimum engine-brake torque value is equal to 0 when the brake unit applies the braking force to at least the drive wheel.

4. The braking/driving force control apparatus as claimed in claim 2, wherein
the braking/driving force control apparatus further comprises a road friction-coefficient calculating section configured to calculate a friction coefficient of a road surface as a calculated friction coefficient; and the engine control unit is further configured to cause the engine to output an engine torque for accelerating the vehicle, when the calculated friction coefficient varies from a high friction-coefficient value to a low friction-coefficient value.

5. The braking/driving force control apparatus as claimed in claim 2, wherein
the braking/driving force control apparatus further comprises a slip-state calculating section configured to calculate a slip state of the drive wheel as a calculated slip state; and
the brake control unit is further configured to control an engine-brake torque in accordance with the calculated slip state, so as to set the optimum engine-brake torque value at a first engine-brake torque value when the slip ratio is greater than a first slip ratio value, and set the optimum engine-brake torque value at a second engine-brake torque value when the slip ratio is smaller than the first slip ratio value, the second engine-brake torque value being greater than the first engine-brake torque value.

6. The braking/driving force control apparatus as claimed in claim 5, wherein
the first engine-brake torque value is an accelerating engine torque, and the second engine-brake torque value is a decelerating engine torque.

7. The braking/driving force control apparatus as claimed in claim 2, wherein
the braking/driving force control apparatus further comprises a wheel-acceleration calculating section configured to calculate an acceleration of the drive wheel as a calculated wheel acceleration; and
the optimum engine-brake torque value is set as an accelerating engine torque when the calculated wheel acceleration has a tendency to decrease a speed of the drive wheel, and is set as a decelerating engine torque when the calculated wheel acceleration has a tendency to increase the speed of the drive wheel.

8. The braking/driving force control apparatus as claimed in claim 1, wherein
the brake control unit is further configured to reduce the brake torque by means of at least one of a shift to neutral position of a transmission, a change of speed ratio of the transmission and a disengagement control of a clutch.

9. The braking/driving force control apparatus as claimed in claim 1, wherein
the brake unit is further configured to be applied to a constant-speed running system for performing an automatic braking at a time of hill-descent running of the vehicle.

10. A braking/driving force control apparatus for a vehicle, comprising:
a brake unit configured to control a braking force to be applied to wheels of the vehicle, in accordance with a state of the vehicle;
a brake control unit configured to control the brake unit; and
an engine control unit configured to control a state of an engine so as to reduce an engine-brake torque or so as to increase a rotational speed of the engine in accordance with an output signal of the brake control unit irrespective of a slip ratio of at least a drive wheel among the wheels, when the brake unit actuates the drive wheel.

11. The braking/driving force control apparatus as claimed in claim 10, wherein
the brake control unit is configured to calculate a value of an optimum engine-brake torque as an optimum engine-brake torque value, and configured to output a signal of the optimum engine-brake torque value; and the engine control unit is further configured to control the engine so as to attain the optimum engine-brake torque value.

12. The braking/driving force control apparatus as claimed in claim 11, wherein the brake control unit is further configured to function as an antiskid brake control unit, and comprises a road friction-coefficient calculating section configured to calculate a friction coefficient of a road surface as a calculated friction coefficient;

the engine control unit is further configured to cause the engine to output an engine torque for accelerating the vehicle, when the calculated friction coefficient has varied from a high friction-coefficient value to a low friction-coefficient value.

13. The braking/driving force control apparatus as claimed in claim 12, wherein the brake control unit comprises a slip-state calculating section configured to calculate a slip state of the drive wheel as a calculated slip state; and the engine control unit is further configured to control the engine-brake torque in accordance with the calculated slip state , so as to set the optimum engine-brake torque value at a first engine-brake torque value when the slip ratio is greater than a first slip ratio value, and set the optimum engine-brake torque value at a second engine-brake torque value when the slip ratio is smaller than the first slip ratio value, the second engine-brake torque value being greater than the first engine-brake torque value.

14. The braking/driving force control apparatus as claimed in claim 13, wherein the first engine-brake torque value is an accelerating engine torque level, and the second engine-brake torque value is a decelerating engine torque level.

15. The braking/driving force control apparatus as claimed in claim 13, wherein the brake control unit comprises a wheel-acceleration calculating section configured to calculate an acceleration of the drive wheel as a calculated wheel acceleration; and the optimum engine-brake torque value is set as an accelerating engine torque when the calculated wheel acceleration has a tendency to decrease a speed of the drive wheel, and is set as a decelerating engine torque when the calculated wheel acceleration has a tendency to increase the speed of the drive wheel.

16. The braking/driving force control apparatus as claimed in claim 11, wherein the optimum engine-brake torque value is equal to 0 when the brake unit is actuating the drive wheel.

17. The braking/driving force control apparatus as claimed in claim 11, wherein the brake unit is further configured to be applied to a constant-speed running system for performing an automatic braking at a time of hill-descent running of the vehicle.

18. A braking/driving force control apparatus for a vehicle, comprising:

an antiskid brake control unit configured to perform an antiskid brake control for increasing or decreasing wheel-cylinder fluid pressures of wheels of the vehicle in accordance with a slip state of the wheels; and an engine control unit configured to control an output of an engine, so as to adjust an engine-brake torque in accordance with an accelerating/decelerating state of the wheels, when the antiskid brake control is acting on at least a drive wheel of the wheels.

19. The braking/driving force control apparatus as claimed in claim 18, wherein the engine control unit is further configured to set an optimum engine-brake torque value at a first engine-brake torque value when a slip ratio of the drive wheel is greater than a first slip ratio value, and set the optimum engine-brake torque value at a second engine-brake torque value when the slip ratio is smaller than the first slip ratio value, the second engine-brake torque value being greater than the first engine-brake torque value, or to set the optimum engine-brake torque value at an accelerating-side engine torque level when the slip ratio is greater than the first slip ratio value, and set the optimum engine-brake torque value at a decelerating-side engine torque level when the slip ratio is smaller than the first slip ratio value.

20. The braking/driving force control apparatus as claimed in claim 18, wherein the engine control unit is further configured to set an optimum engine-brake torque value as an accelerating engine torque when a calculated wheel acceleration has a tendency to decrease a rotational speed of the drive wheel, and set the optimum engine-brake torque value as a decelerating engine torque when the calculated wheel acceleration has a tendency to increase the rotational speed of the drive wheel.

\* \* \* \* \*